Jan. 3, 1956  J. B. SEBOK ET AL  2,728,953
MACHINE FOR MAKING RESILIENT FILTER ELEMENTS AND BATTS
Original Filed May 7, 1948  6 Sheets-Sheet 1

Inventors
Joseph B. Sebok &
Frank Sebok

Jan. 3, 1956   J. B. SEBOK ET AL   2,728,953
MACHINE FOR MAKING RESILIENT FILTER ELEMENTS AND BATTS
Original Filed May 7, 1948   6 Sheets-Sheet 2

Inventors
Joseph B. Sebok &
Frank Sebok
Attys.

Jan. 3, 1956 J. B. SEBOK ET AL 2,728,953
MACHINE FOR MAKING RESILIENT FILTER ELEMENTS AND BATTS
Original Filed May 7, 1948 6 Sheets-Sheet 3
Fig. 3
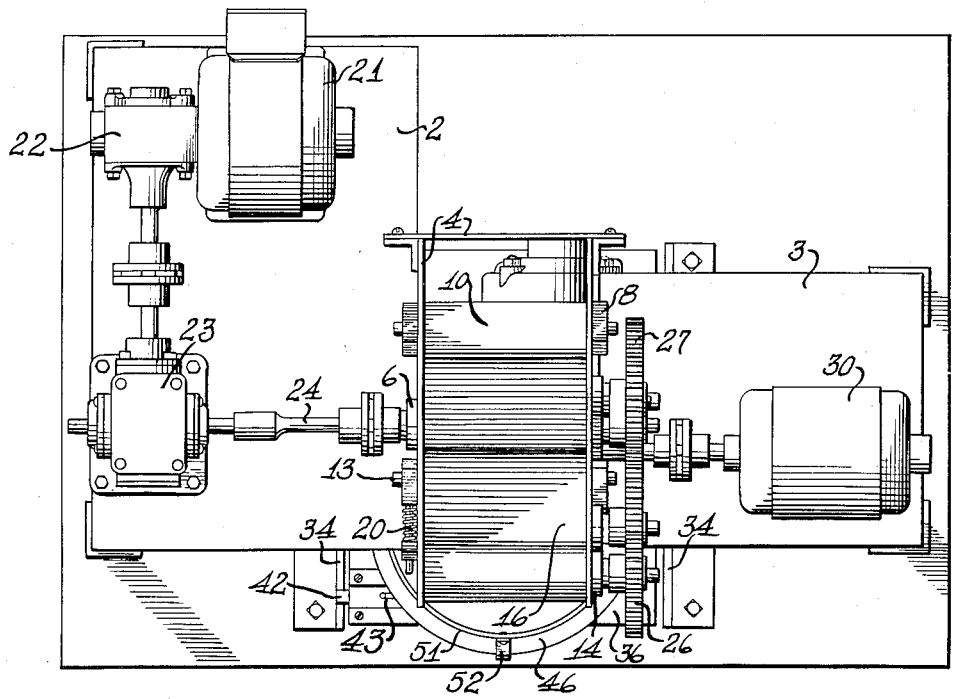
Fig. 4
Fig. 5
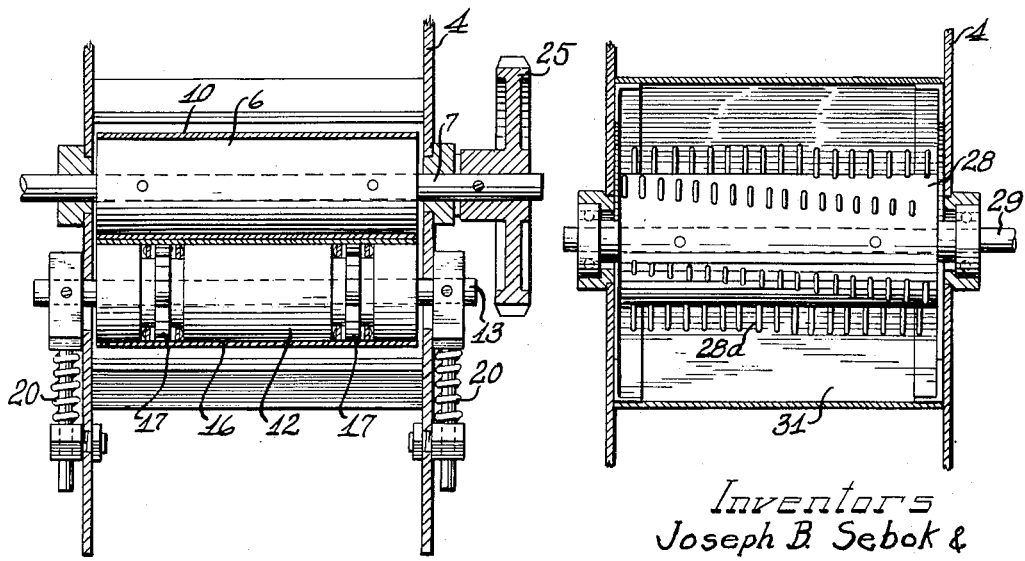
Inventors
Joseph B. Sebok &
Frank Sebok

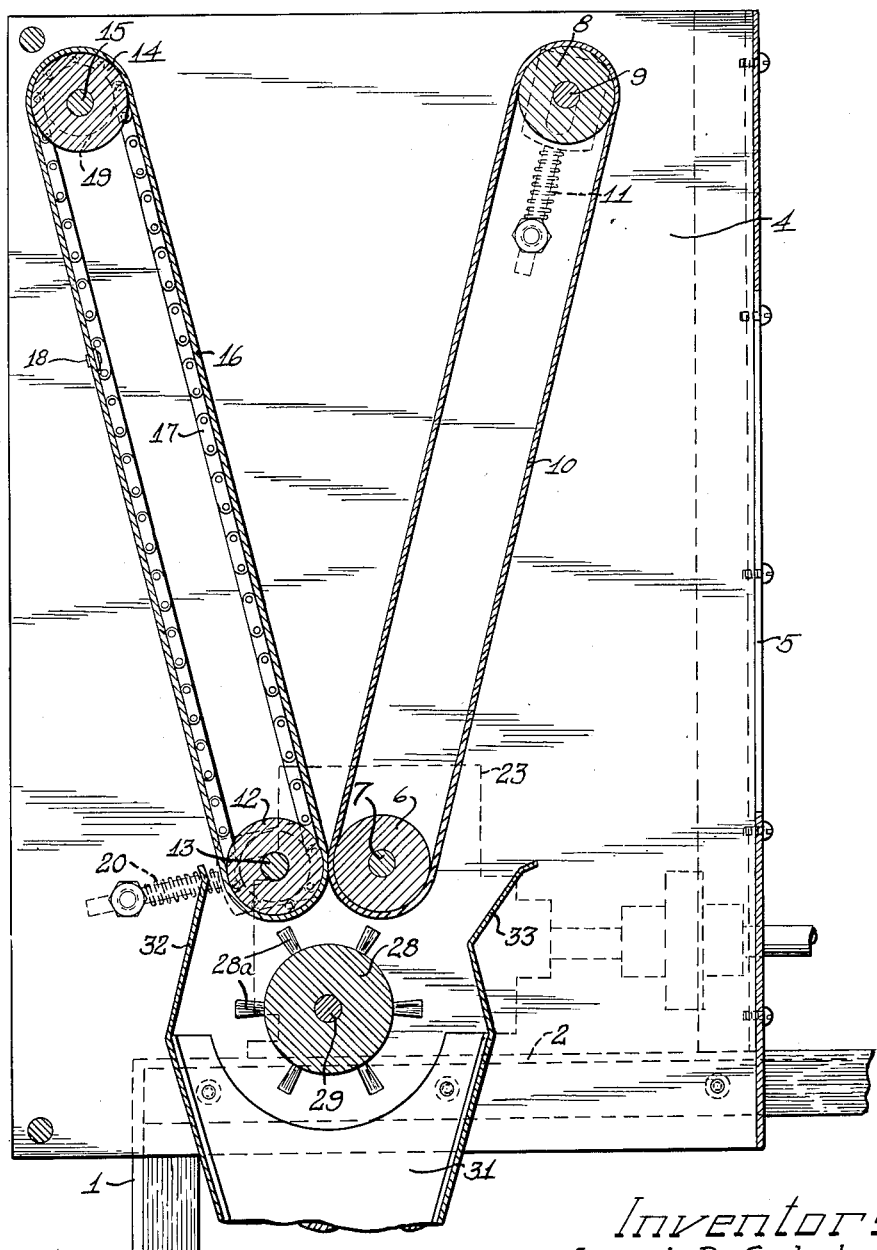

Jan. 3, 1956     J. B. SEBOK ET AL     2,728,953
MACHINE FOR MAKING RESILIENT FILTER ELEMENTS AND BATTS
Original Filed May 7, 1948     6 Sheets-Sheet 5
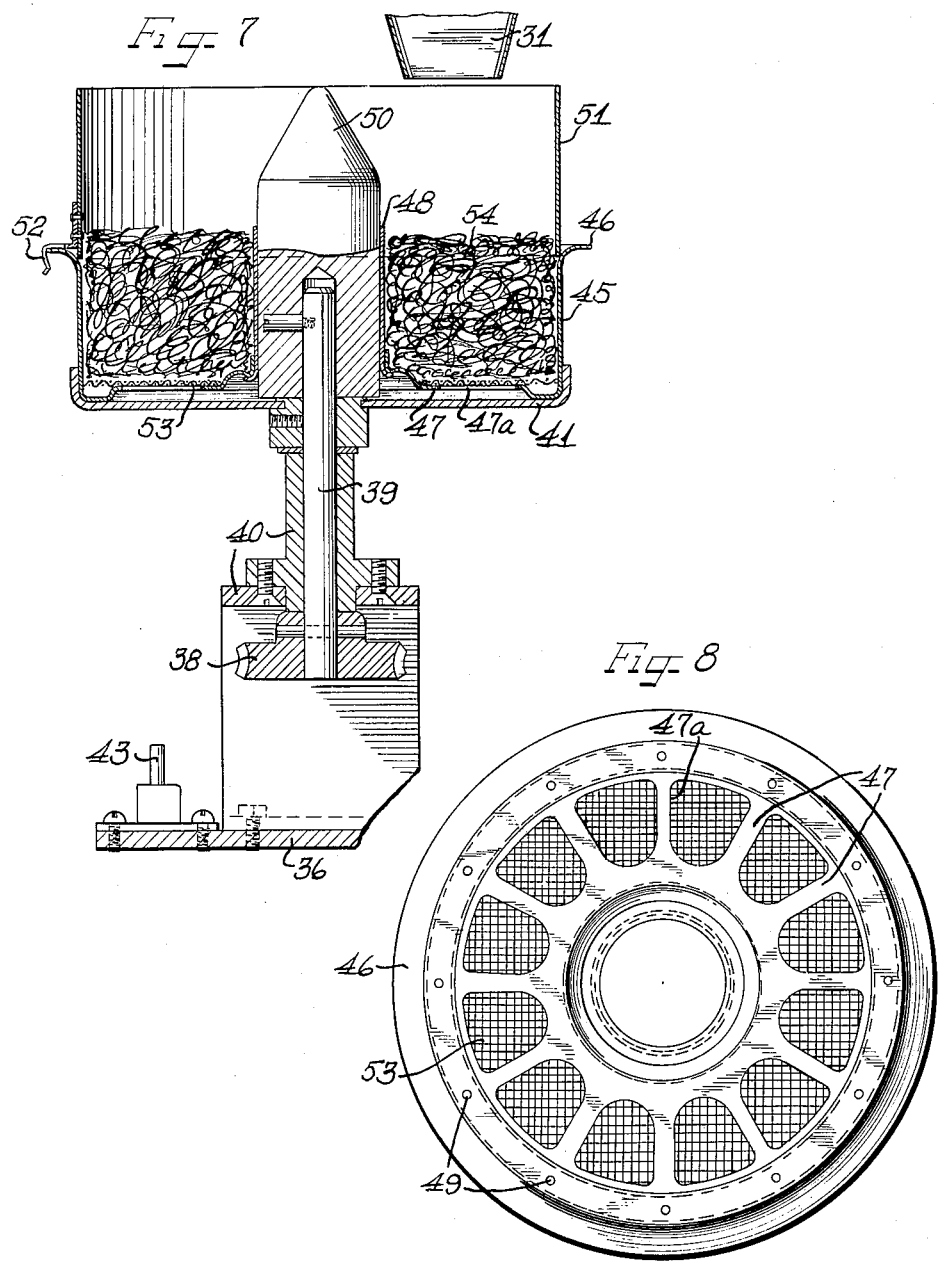
Inventors
Joseph B. Sebok &
Frank Sebok

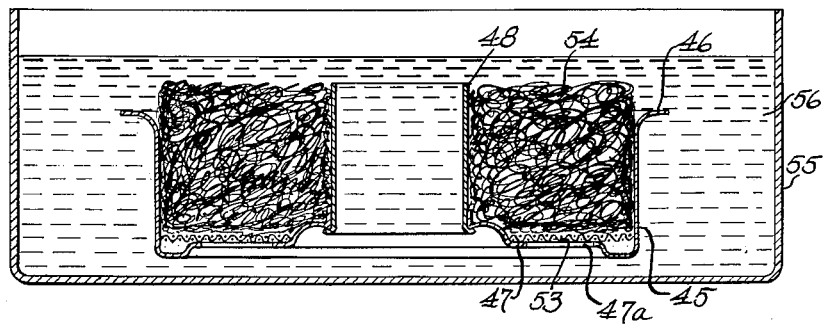
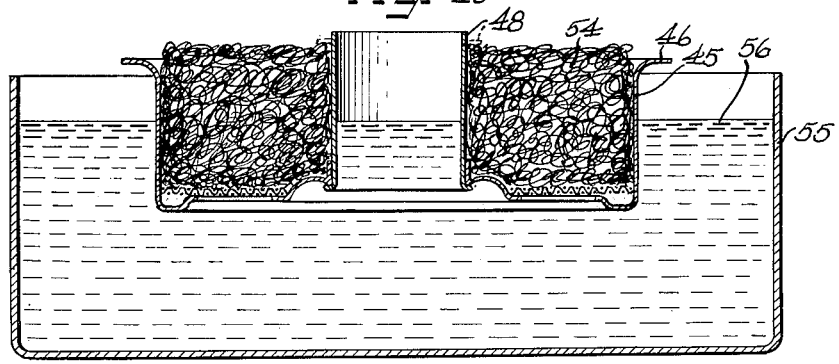
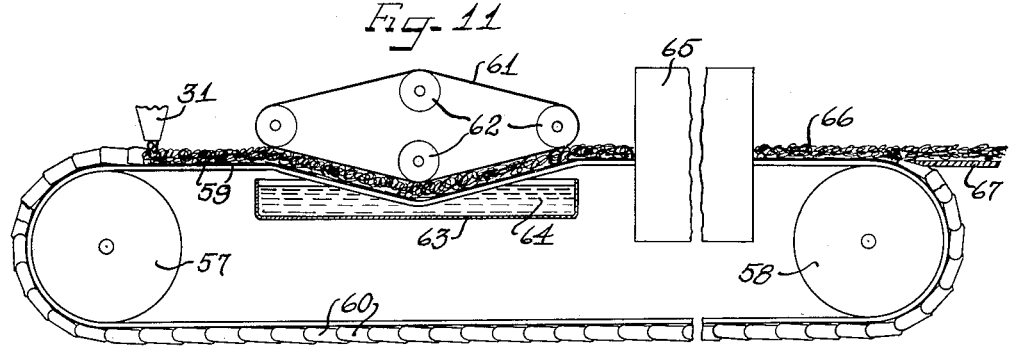
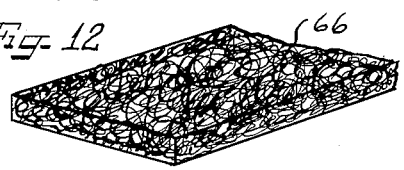
Inventors
Joseph B. Sebok &
Frank Sebok
by Attys.

United States Patent Office 2,728,953
Patented Jan. 3, 1956

2,728,953

MACHINE FOR MAKING RESILIENT FILTER ELEMENTS AND BATTS

Joseph B. Sebok and Frank Sebok, Detroit, Mich., assignors to Houdaille-Hershey Corporation, Detroit, Mich., a corporation of Michigan Original application May 7, 1948, Serial No. 25,726. Divided and this application December 20, 1950, Serial No. 201,728

3 Claims. (Cl. 19—67)

This application is a division of our copending application entitled Method of Making Resilient Filter Elements and Batts, filed May 7, 1948, Serial No. 25,726, now Patent No. 2,680,899, wherein the method performed by the instant invention is more fully set forth, described and claimed.

For purposes of clarity, the instant invention will be described mainly in connection with the manufacture of filter elements and filter units for automotive air cleaners; that is, filter elements and filter units used in air cleaners for association with the carburetor air intake of internal combustion engines. As these units and elements have been manufactured in the past, they were very objectionably expensive and added considerably to the cost of an air cleaner, especially because the casing structure of an air cleaner is substantially essential as to material, shaping, finishing, etc., and only a very minor saving may be acquired by variation in that casing. On the other hand, if the cost of the filter element may be reduced without the sacrifice of efficiency, without endangering pullover of cleansing liquid into the carburetor of the engine, and without increasing the restriction to air flow through the cleaner, such saving is very substantial in the overall cost of the cleaner.

One of the prime objects of the instant invention therefore is to provide a machine for making such a filter element and filter unit in an extremely economical manner and of economical material, and yet provide a better and more durable unit and a more satisfactory unit overall than has heretofore been produced.

Another object of this invention is the provision of a machine for making resilient self-sustaining filter elements or batts from fibrous material such as hog hair.

Also an object of the invention is the provision of a machine for making filter elements or filter units in an exceedingly rapid and economical manner, the machine requiring very little power for its operation.

Also an object of the invention is the provision of a machine for making a complete filter unit including both a holding shell and a fibrous filter element formed within and secured to the shell.

Still another feature of this invention resides in the provision of a machine for automatically producing a resilient filter element from animal hair, such as hog hair, which machine embodies a high speed comb-like element that in effect blows the hair into filter forming position after separating the various hair strands.

A further object of the invention resides in the provision of a machine for making an air filter element from relatively short animal hair, which machine automatically removes the dust and scale from the hair while forming the filter element.

It should also be noted that the instant invention embodies a machine capable of forming an air cleaner filter unit embodying a filter holding shell having a bottom made up of a plurality of radial ribs with open spaces therebetween, a protective screen covering the bottom, and a mass of relatively short animal hair such as hog hair, forming the element which is bonded in and to the holding shell. Thus, the filter element maintains the protective screen in proper position in the shell and eliminates the previously necessary spot-welding or equivalent operation to hold that screen in place.

The individual filter element and unit or batt, considered as a product or article of manufacture, is more specifically set forth, described, and claimed in a Joseph B. Sebok copending application for patent entitled "Filter Unit and Resilient Filter Element or Batt," filed March 20, 1948, Serial No. 16,078, now Patent No. 2,582,915.

While some of the more salient features, characteristics and advantages of the instant invention have been above pointed out, others will become apparent from the following disclosures, taken in conjunction with the accompanying drawings, in which—

Figure 3 is a top plan view of the machine;

Figure 4 is a fragmentary plan sectional view through the discharge end of the rollers and belts arrangement with parts shown in elevation, and taken substantially as indicated by the line IV—IV of Fig. 2;

Figure 5 is a view similar in character to Fig. 4, but taken on a lower plane as indicated by the line V—V of Fig. 1, illustrating the comb arrangement of the machine;

Figure 6 is a fragmentary enlarged and substantially central vertical sectional view through the upper portion of the machine taken substantially as indicated by the line VI—VI of Fig. 1;

Figure 7 is a fragmentary enlarged substantially central vertical sectional view of the lower portion of the machine taken substantially as indicated by the line VII—VII of Fig. 1;

Figure 8 is an enlarged bottom plan view of the filter holding shell in which the filter unit is formed;

Figure 9 is a central vertical sectional view illustrating the dipping of the filter unit undergoing formation in a bath of plastic bonding material;

Figure 10 is a view similar in character to Fig. 9 illustrating the complete filter unit being withdrawn from the bath of plastic bonding material;

Figure 11 is a diagrammatic, part sectional and part elevational view illustrating in general the process of making continuously a self-sustaining resilient batt of indefinite length; and Figure 12 is a fragmentary pictorial illustration of the resultant batt made as indicated in Fig. 11.

As shown on the drawings:

Figure 1:
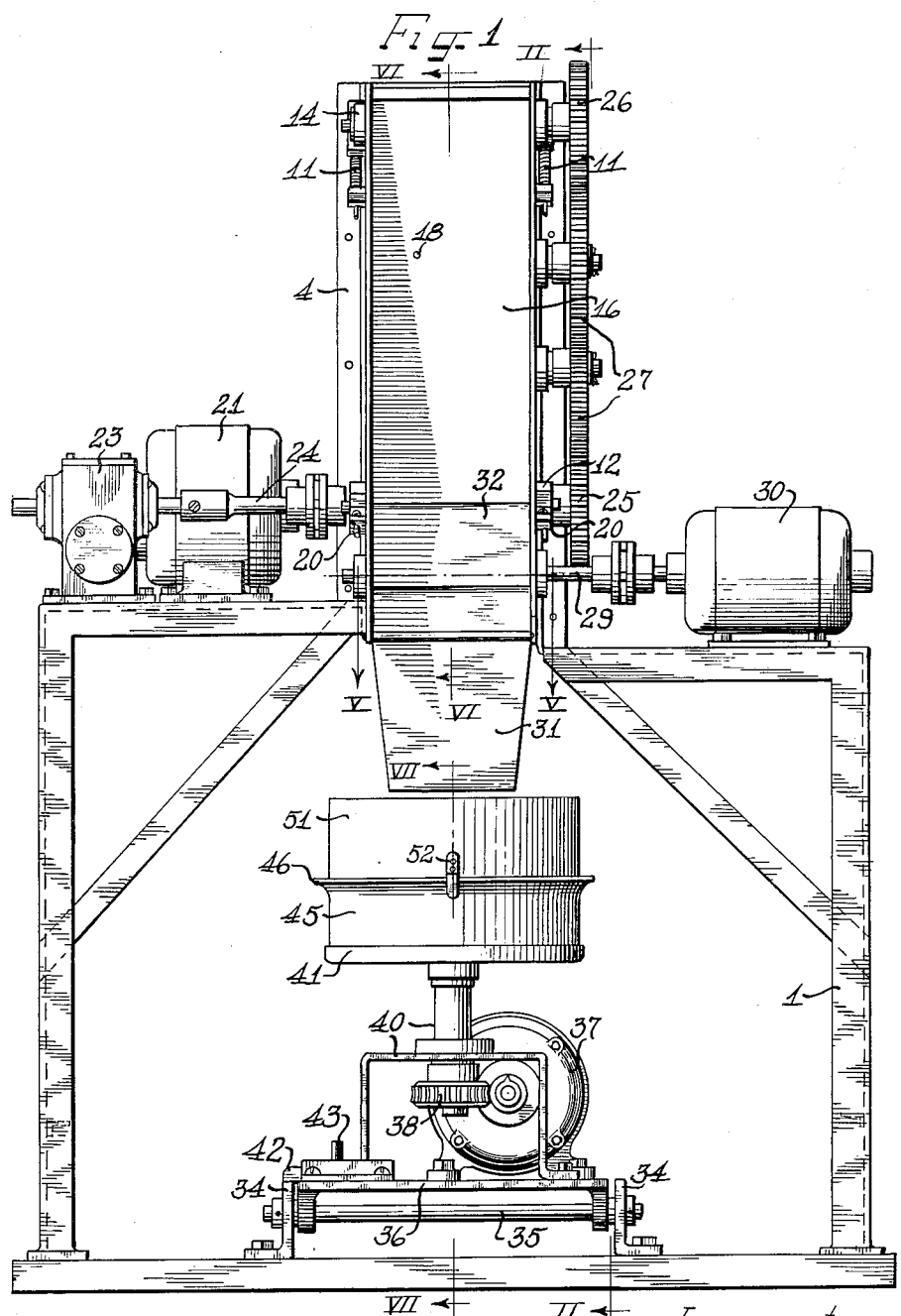
Figure 1 is a front elevational view of a machine embodying principles of the instant invention.

A product, such as a filter element or unit for an air cleaner, or a resilient batt for cushioning or other purposes, made by the machine embodying the instant invention, may easily and economically be formed from short animal hair such as rabbit fur, horse hair, hair from the body of a cow or similar animal, but preferably from hog hair, a product having an extremely limited use prior to the advent of this invention. Applicants know of no instance in which hog hair was ever used as a filter element, especially for automotive air cleaners. Cattle tail hair has been used for this purpose heretofore but that hair is of considerable length and requires special treatment before it can be used. Further, the resultant cattle tail hair filter element is not as satisfactory or endurable as one made of hog hair under the instant invention.

It makes no difference whether summer or winter hair is used, the average variation in length being approximately three-eighths of an inch, and that variation is not sufficient to warrant any special attention.

For purposes of clarity, it may be better herein to briefly discuss the method practiced by the machine forming the subject matter of this invention.

The hair is first run through a gin mill to eliminate or pulverize toe nails, remove scale, etc. The hair is then flameproofed by dipping the same in a suitable bath, which may be a 15 to 20% solution by weight of ammonium sulfamate in water. Such operation also eliminates static electricity from the hairs, and both purposes are accomplished in a single operation. After drying, the material is weighed, in the event individual filter elements are to be made, and that is the way the instant machine is described again for purposes of clarity, and then each batch is passed through the machine to form a filter element.

After the forming of the filter element, the entire assembly including the filter holding shell together with the hair mass is dipped in a solution of a plastic bonding agent to bond the hair fibers together and also bond the entire mass of hair directly in and to the holding shell. For this purpose an oil resistant rubber substitute bonding agent, such as neoprene latex, may be used, and a solution of 25% solids and 75% water is satisfactory for this purpose. The neoprene latex may be cured or set by heat treatment at 250° F. for 2 to 5 minutes, by way of example. Of course, once set, the bonding agent is not thereafter soluble in water. Other bonding agents may also be employed, such for example as a vinyl solution, as more fully pointed out in my aforesaid copending application. The removal of the filter element after dipping into the bonding agent solution is also a salient feature of the method, in that if it is withdrawn from a dipping bath with great rapidity, it will be denser, of less height, than if it is gently withdrawn from the dipping bath. Therefore, the speed of withdrawal is utilized to control the density and thickness of the resultant filter element.

In the illustrated embodiment of the machine there is shown a suitable frame 1 made of any suitable material such as angle iron, and with a pair of platforms 2 and 3 (Fig. 3) on top. A box-like housing 4 is also mounted on top of the frame, substantially centrally of the forward side thereof, and the front plate of this housing has been left removed so as to provide both better vision of and access to the mechanism inside the housing. As seen best in Fig. 6, the rear wall of the housing is provided with a relatively large aperture or opening 5 therein.

With reference again to Fig. 6, it will be seen that inside the housing there is a lower roll 6 carried on a shaft 7 and an upper roll 8 carried on a shaft 9, over which rolls an endless belt 10 travels. The upper roll 8 is urged away from the roll 6 by means of a suitable spring biasing mechanism 11 on each side of the housing 4 to maintain tension on the belt. Another pair of rolls including a lower roll 12 on a shaft 13 and an upper roll 14 on a shaft 15 carry a second belt 16, which belt carries a chain 17 on the inside secured to the belt in any suitable manner as by one or more rivets 18. The rolls 12 and 14 are notched as indicated at 19 in Fig. 6 to accommodate such chain.

As is clearly apparent from the showing in Figs. 3 and 6, the lower rolls 6 and 12 are disposed immediately adjacent each other, while the upper rolls 8 and 14 are spread apart, so that the inside reaches of the belts 10 and 16 form a relatively large V-shaped pocket extending the full width of the housing 4. The lower roll 12 is biased inwardly so as to establish tight contact between the belts at the apex of the V pocket by means of suitable spring biasing elements 20 on each side of the housing. It is important that the belts be maintained in close contact with each other at the apex of the V pocket.

As is seen best from the showing in Fig. 3 the roll 6 is driven from a fractional horsepower motor 21 mounted on the platform 2 through a double set of speed reducers 22 and 23 and a shaft 24. A satisfactory operating speed for the roll 6 is nine revolutions per minute. The drive is transferred from the roll 6 to the upper roll associated with the forward belt by means of a gear train on the opposite side of the housing. The gear train, best seen in Fig. 2, includes a gear 25 on the shaft 7 of the roll 6, a gear 26 of the same size on the shaft 15 of the roll 14, and a pair of like gears 27 disposed therebetween and mounted on suitable stub shafts. Thus, the roll 14 and the belt 16 is driven at the same speed as the roll 6. Both belts are therefore positively driven, and the inside reaches of these belts travel downwardly as indicated by the arrows in Fig. 6.

With reference now to Figs. 5 and 6, it will be seen that beneath the apex of the V pocket formed by the belts, a rotary comb 28 is carried on a shaft 29. The comb extends the full width of the housing 4. Specifically, the comb comprises a roll with several spiral rows of pins 28a extending outwardly therefrom. This comb may be driven by a fractional horsepower motor 30 mounted on the platform 3 as seen clearly in Figs. 1 and 3. A satisfactory speed for this comb is in the neighborhood of 5000 revolutions per minute.

As the hair deposited in the V pocket between the belts 10 and 16 emerges from the apex of the V, it is engaged by the rapidly spinning comb and the individual hair strands are separated and hurled downwardly through a discharge spout 31. As seen in Fig. 6, a forward flange 32 extends from the top of the spout inside the housing 4 to guide the hair into the spout. There is also a rear flange 33 provided which is turned backward in its upper portion to permit dust and scale whipped from the hair by the action of the comb to be discharged rearwardly through the opening 5 in the housing. The high speed of the comb will give the effect of a blower both for advancing the hair through the discharge spout 31 and also for discharging the dust and scale through the opening 5 in the housing.

Figure 2:
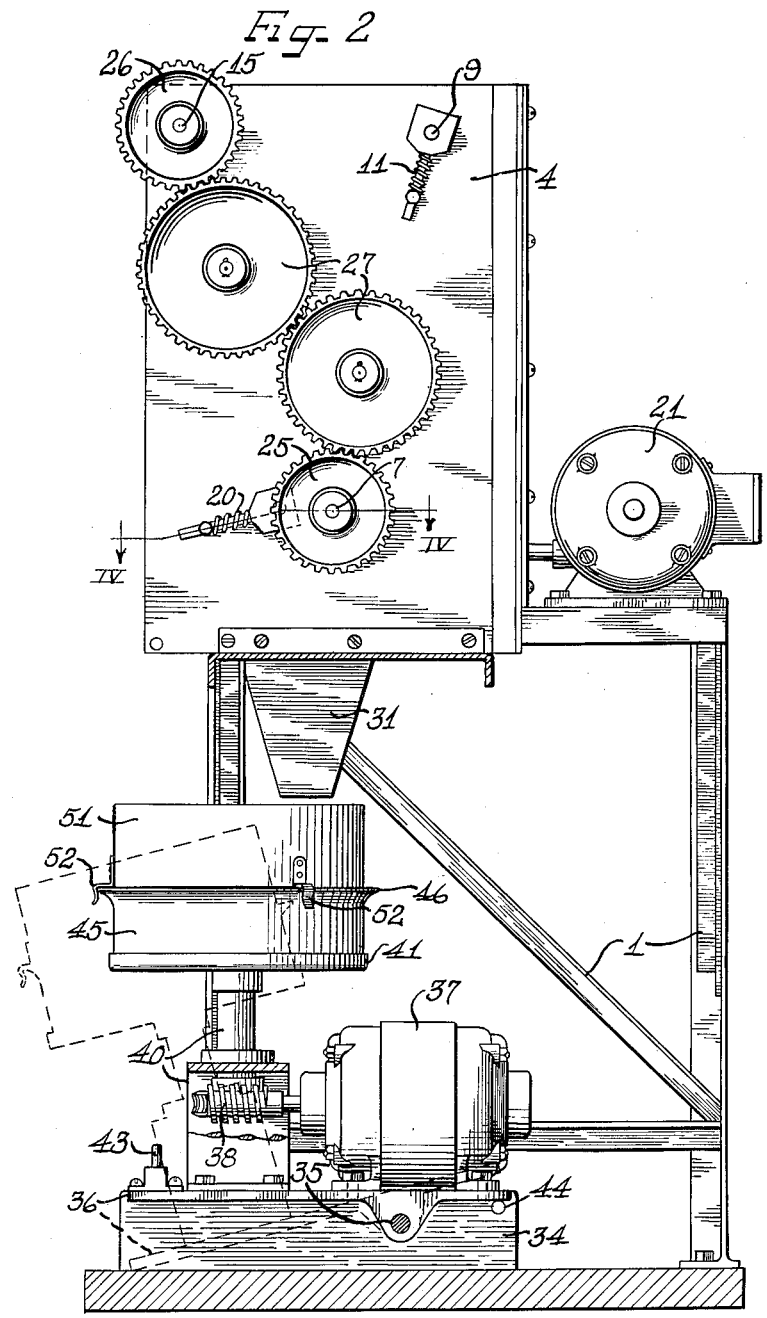
Figure 2 is a vertical sectional view of the structure of Fig. 1, taken substantially as indicated by the line II—II of Fig. 1, looking in the direction of the arrows, and in effect providing a side elevational view of the machine.

The lower portion of the machine is best seen in Figs. 1, 2, and 7. A pair of side members 34—34 support a cross shaft 35 upon which a platform 36 may pivot, as indicated by the dotted lines in Fig. 2. On the rear of this platform a fractional horsepower electric motor 37 is mounted which, through a suitable worm and gear arrangement 38, drives a vertical shaft 39 journalled in a superstructure 40, as best seen in Fig. 7. The upper end of this shaft fixedly carries a filter unit supporting pan 41 which, of course, rotates with the shaft.

Everything on the platform 36 tilts along with the platform upon release of a latch member 42 (Figs. 1 and 3) which is actuated by a slide pin 43. A cross pin 44 (Fig. 2) limits the backward tilting movement of the platform and holds it level during operation of the machine.

When it is desired to operate the machine, the actual filter holding shell that is ultimately used in the complete air cleaner is placed upon the pan 41. With reference more particularly to Figs. 7 and 8, it will be seen that this shell comprises a cup-like metallic formation including an outer cylindrical wall 45 having an outwardly flared upper margin 46. The bottom of the shell includes a plurality of radially extending ribs 47 with relatively large apertures 47a therebetween to permit passage of air upwardly through the filter unit when in the air cleaner. In the illustrated instance the particular filter unit is of the type for use in a so-called hat type liquid bath air cleaner for association with a downdraft carburetor. Such an air cleaner has a center outlet passage for the clean air, and accordingly the filter shell is preferably provided with a center tube 48. This center tube 48 may be attached to the shell after the formation of the filter element from the hair, if so desired, but it facilitates matters to attach it to the shell previously to the formation of the hair element, and then after the element has been completed spin the upper margin outwardly to the dotted line position seen in Fig. 10. In the outer portion of the bottom thereof the shell is also provided with a plurality of relatively small apertures 49 to facilitate drainage of the plastic compound after the dipping operation.

When there is to be a central opening through the filter element, a plug 50, of wood or any suitable material, is attached to the top of the shaft 39, and if the filter element is not to have an aperture therein, that plug may easily be eliminated. Before the reception of the hair by the filter shell, a cylindrical sleeve 51 is preferably snapped over the lip 46 of the shell by spring clamps 52 or in any equivalent manner, to hold the hair in position above the shell before that hair is bonded by the plastic.

From the showing in Fig. 8, it will be seen that where a protective screen is required, such a screen 53 may merely be laid in the bottom of the shell over the ribs 47. Formerly, this screen was spot-welded to each of the ribs 47 and that operation, in the illustrated instance, would require twelve spot-welds. Those spot-welds are no longer necessary with the present invention, because the plastic bonding agent not only bonds the individual strands of hair together, but bonds the hair filter element directly to the inside of the shell and to the screen 53, thus holding the screen firmly in position.

During operation of the machine, the filter holding shell is first mounted in position, and the sleeve 51 placed thereupon. The motors 21, 30 and 37 are then started, and a predetermined quantity of short animal hair, such as hog hair, is placed in the V pocket defined by the belts 10 and 16. This hair is gradually discharged through the apex of the V pocket between the belts and as it emanates from the lower end of the pocket, the hair is whipped by the comb 28, the tines or pins 28a of this comb separating the individual strands of hair, and acting as a blower to force these strands of hair downwardly through the discharge spout 31 directly into the spinning filter holding shell. At the same time the hair is forced downwardly through the chute 31, dust and scale from the hair is forcibly discharged rearwardly through the opening 5 in the back of the housing 4.

The predetermined quantity of hair passed between the belts will be distributed evenly and with the individual hair strands disposed at random in the form of a mass 54 inside the filter holding shell and partially within the sleeve 51 as seen clearly in Fig. 7. The individual strands of hair will be interlocked with each other to such an extent that when the full measured quantity of hair has been deposited, the platform 36 may be tilted forwardly as indicated by dotted lines in Fig. 2, and the shell and sleeve removed therefrom, and then the sleeve removed from the shell, with the mass 54 retaining its original shape. The mass will then have the appearance of the showing in Fig. 9.

After the shell together with the hair mass 54 is removed from the pan 41, the entire structure is then dipped into the plastic bonding solution. This operation is illustrated in Figs. 9 and 10 wherein a tank 55 contains a quantity of solution 56. The shell and filter mass is deposited in the tank so that the batt is entirely submerged as indicated in Fig. 9. Then the entire structure is lifted from the tank as indicated in Fig. 10. It will be noted that the mass is higher or thicker from top to bottom before being dipped than it is after being dipped. The speed with which the shell is withdrawn from the plastic bath will gauge the thickness of the filter element. Usually a gentle dipping is preferred, and the filter element will shrink to the proportion indicated in Figs. 9 and 10 by virtue of a relatively gentle withdrawal from the plastic bath. Upon withdrawal from the bath, the entire unit is permitted to drain free of excess plastic through the holes 49 in the bottom of the shell, and then it is subjected to a drying operation, either air dried which of course requires the most time, or it may be subjected to a heat treatment as by passing it through an oven, as above explained, to hasten the drying time. When dry, the individual strands of hair are bonded to each other at random and at intervals, providing a filter mass or element that will not compact during use, that will not channel during use, that is resilient, and of substantially uniform density throughout. Such an element on actual test with U. S. Army fine dust has proven of greater efficiency than the cattle tail hair filter element used heretofore.

In Figs. 11 and 12 we have indicated, somewhat diagrammatically, how a resilient batt of indefinite length may be made from hog hair or equivalent short animal hair. In this construction the diagrammatically illustrated apparatus includes a pair of pulleys 57 and 58 around which an endless conveyor is trained. This conveyor includes a plurality of pivotal and overlapping bottom plates 59, and pivotal and overlapping upstanding side plates 60 on each side of the conveyor. Thus, the structure is channel-shaped in cross section, but sufficiently flexible to pass around the pulleys 57 and 58. The hair is deposited continuously on the conveyor from the discharge spout 31 of the machine above described. Instead of measuring out predetermined quantities of the hair for each individual filter element, as was above described, the hair is merely continuously placed between the belts so that a continuous and even discharge of hair is acquired through the spout 31. As the deposited hair travels along on the conveyor an endless belt 61 mounted upon a series of pulleys 62 presses the conveyor and hair thereon into a tank 63 containing a bath of plastic bonding solution 64. The conveyor then carries the now wet mass of hair through a drying oven diagrammatically indicated at 65. The finished batt 66 emanates from the drying oven, and a section of this batt is illustrated in Fig. 12. The batt is separated from the conveyor in any suitable manner such as by a scraper element 67.

The completed batt may be used for many and various purposes. The batt is self-sustaining, resilient, and of substantially uniform density, so that it may either be used as a filter element or as a cushion. Sections may be removed from the batt in any desired shape and used as a filter medium in air conditioning systems, air purifying systems, and similar locations. Various other uses as will be apparent to one skilled in the art may be made of such a batt of material.

From the foregoing, it is apparent that we have provided a machine for making a resilient filter element or batt of bonded short animal hair, especially hog hair, thus providing a new use for a material, hog hair, that heretofore had no use as a filter element and was limited in its capacity for any use. Further, the machine is economical to operate, efficient in operation, and highly durable, resulting in the production of a superior and economical product.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In a machine for making a resilient batt of fibrous material, a housing, a spout in said housing, said spout projecting partially therefrom and having an inlet in the housing and an outlet outside thereof, a high speed rotary comb mounted within said spout adjacent the inlet thereof, means above said spout inlet extending partially therein for delivering fibrous material to said comb which whips the material to separate the fibers thereof and force the material through said spout outlet, said housing having an opening in the wall above said spout inlet, said comb by its whipping action also separating dust and scale from the material, and said material delivering means coacting with an adjacent wall of the spout inlet to define an outlet for the separated dust and scale, whereby the action of said comb in effects blows same through said defined outlet and to said housing opening.

2. In a machine for making a resilient batt of short animal hair, a housing, a spout in said housing, said spout projecting partially therefrom and having an inlet in the housing and an outlet outside thereof, a high speed rotary comb mounted within said spout adjacent the inlet thereof, means above said spout inlet extending partially therein for delivering hair to said comb which whips the hair to separate the strands thereof and force the hair through said spout outlet, said housing having an opening in the wall above said spout inlet, said comb by its whipping action also separating the dust and scale from the hair, the upper portion of the spout wall adjacent said spout inlet and nearest said opening being inclined toward said opening and coacting with said hair delivering means to define an outlet for separated dust and scale, whereby said comb may readily discharge the dust and scale through said defined outlet and said opening.

3. In a machine for making a resilient batt of short animal hair, a housing, a spout in said housing, said spout projecting partially therefrom and having an inlet in the housing and an outlet outside thereof, a high speed rotary comb mounted within said spout adjacent the inlet thereof, means above said spout inlet extending partially therein for delivering hair to said comb which whips the hair to separate the strands thereof and force the hair through said spout outlet, said housing having an opening in the wall above said spout inlet, said comb by its whipping action also separating dust and scale from the hair, the spout being wider near the inlet than the outlet, the upper portion of the spout wall adjacent the spout inlet and nearest said opening being inclined toward said opening and coacting with said hair delivering means to define an outlet for the separated dust and scale, and said opposite spout wall adjacent the spout inlet being inclined toward the comb to guide hair into the spout while dust and scale is discharged through said defined outlet and said opening.

References Cited in the file of this patent
UNITED STATES PATENTS

| | | |
|---|---|---|
| 354,322 | Ketteringham | Dec. 14, 1886 |
| 654,079 | Talton | July 17, 1900 |
| 792,151 | McDowell | June 13, 1905 |
| 1,056,915 | Lappen | Mar. 25, 1913 |
| 1,202,699 | Foss et al. | Oct. 24, 1916 |
| 1,658,731 | Mitchell | Feb. 7, 1928 |
| 1,740,289 | Fanton | Dec. 17, 1929 |
| 1,740,990 | MacKenzie | Dec. 24, 1929 |
| 1,817,086 | Lindsay et al. | Aug. 4, 1931 |
| 1,875,710 | Dornan | Sept. 6, 1932 |
| 1,905,896 | Brown | Apr. 25, 1933 |
| 2,023,273 | Leguillon | Dec. 3, 1935 |
| 2,028,388 | Gerard et al. | Jan. 21, 1936 |
| 2,068,587 | Aldrich, Jr. | Jan. 19, 1937 |
| 2,069,880 | Gelbman et al. | Feb. 9, 1937 |
| 2,411,660 | Manning | Nov. 26, 1946 |
| 2,446,644 | Fischer | Aug. 10, 1948 |
| 2,523,642 | Becker | Sept. 26, 1950 |
| 2,529,674 | Bluhm et al. | Nov. 14, 1950 |